(12) United States Patent
Waters

(10) Patent No.: US 10,273,187 B2
(45) Date of Patent: Apr. 30, 2019

(54) METAL OXIDE ACTIVATED CEMENT

(71) Applicant: Trevor Cyril Waters, Coogee (AU)

(72) Inventor: Trevor Cyril Waters, Coogee (AU)

( * ) Notice: Subject to any disclaimer, the term of this patent is extended or adjusted under 35 U.S.C. 154(b) by 12 days.

(21) Appl. No.: 15/845,857

(22) Filed: Dec. 18, 2017

(65) Prior Publication Data

US 2018/0105464 A1   Apr. 19, 2018

Related U.S. Application Data

(63) Continuation-in-part of application No. 15/625,349, filed on Jun. 16, 2017, now abandoned, which is a continuation of application No. 14/223,787, filed on Mar. 24, 2014, now Pat. No. 9,708,219.

(60) Provisional application No. 61/810,010, filed on Apr. 9, 2013.

(30) Foreign Application Priority Data

Mar. 24, 2013 (AU) ................................ 2013901015

(51) Int. Cl.
| | |
|---|---|
| C25F 3/00 | (2006.01) |
| C04B 28/00 | (2006.01) |
| C04B 28/24 | (2006.01) |
| C04B 12/00 | (2006.01) |

(52) U.S. Cl.
CPC ............ *C04B 28/008* (2013.01); *C04B 12/00* (2013.01); *C04B 28/003* (2013.01); *C04B 28/005* (2013.01); *C04B 28/24* (2013.01); *Y02P 40/165* (2015.11)

(58) Field of Classification Search
CPC ............................ C04B 28/005; C04B 28/008
USPC ........... 216/99; 106/618, 619; 427/136, 140, 427/403, 427; 428/689; 530/504, 506
See application file for complete search history.

(56) References Cited

U.S. PATENT DOCUMENTS

| | | | |
|---|---|---|---|
| 4,994,113 A | 2/1991 | Helmstetter | |
| 7,833,935 B2 | 11/2010 | Menini et al. | |
| 8,142,856 B2 | 3/2012 | Chevalier | |
| 8,177,909 B2 | 5/2012 | Constantz et al. | |
| 9,321,681 B2 * | 4/2016 | Dubey | ...................... C04B 7/32 |
| 9,708,219 B2 | 7/2017 | Waters | |
| 2002/0009622 A1 | 1/2002 | Goodson | |
| 2007/0144405 A1 | 6/2007 | Weibel | |
| 2010/0053957 A1 | 3/2010 | Boxley | |
| 2011/0239904 A1 | 10/2011 | Mitchell | |
| 2011/0263466 A1 | 10/2011 | Rose | |
| 2011/0283921 A1* | 11/2011 | Schumacher | ......... C04B 28/021 106/708 |
| 2012/0024196 A1 | 2/2012 | Gong et al. | |
| 2012/0156381 A1 | 6/2012 | Allouche et al. | |
| 2012/0304894 A1 | 12/2012 | Abdullah et al. | |
| 2013/0284069 A1 | 10/2013 | Dubey | |
| 2013/0324674 A1 | 12/2013 | Saleh et al. | |
| 2014/0238273 A1 | 8/2014 | Sagoe-Crentsil et al. | |
| 2014/0284309 A1 | 9/2014 | Waters | |
| 2017/0283322 A1 | 10/2017 | Waters | |
| 2018/0105465 A1 | 4/2018 | Waters | |

FOREIGN PATENT DOCUMENTS

| | | | |
|---|---|---|---|
| CN | 1358684 A | | 7/2002 |
| CN | 102303968 A | * | 1/2012 |
| CN | 102303968 A | | 1/2012 |
| WO | 1993025492 A | | 12/1993 |

OTHER PUBLICATIONS

Machine Translation of CN 102303968A, rendered on Aug. 21, 2017.*
Australian Government—IP Australia "Patent Examination Report No. 1," 3 pages, dated Nov. 23, 2016.
UK Search Report dated Sep. 23, 2014 for corresponding GB patent application 1405241.9.
Australian Examination Report, dated Sep. 6, 2018, 4 pages.

* cited by examiner

*Primary Examiner* — Nadine G Norton
*Assistant Examiner* — Christopher Remavege
(74) *Attorney, Agent, or Firm* — Trenner Law Firm, LLC; Mark D. Trenner

(57) ABSTRACT

A process for making a cement, the cement containing a naturally occurring silicate bound in an organic binder, and a metal oxide. An example process includes dissolving the organic binder at least in part, using an effective amount of a chemical activator. An example process also includes providing the silicate to react with other components of the cement. An example process also includes providing the silicate to participate in crystal growth. An example process also includes providing the silicate so that the cement is a structural load bearing cement.

14 Claims, No Drawings

METAL OXIDE ACTIVATED CEMENT

CROSS REFERENCE TO RELATED APPLICATIONS

This application is a continuation-in-part of U.S. patent application Ser. No. 15/625,349, which is a continuation U.S. patent application Ser. No. 14/223,787, which claims the benefit of priority from AU Provisional Patent Application Number 2013901015 entitled A Metal Oxide Activated Cement filed on Mar. 24, 2013 and U.S. Provisional Patent Application No. 61/810,010 entitled Metal Oxide Activated Cement filed on Apr. 9 2013, each of which the contents are incorporated herein by reference (as if recited below).

STATEMENT REGARDING FEDERALLY SPONSORED RESEARCH AND DEVELOPMENT

Not Applicable

FIELD OF THE INVENTION

The present invention pertains to the field of hydraulic cement materials.

DISCUSSION OF RELATED ART

Hydraulic Portland cements are calcium silicate cements made with a combination of compounds containing elements of calcium, silicon, aluminum, and iron bearing shale, clay and limestone. A series of oxidization reactions cause the materials to fuse and so create cement clinker. Very high temperatures are required in the conventional production of cements. Finely ground powder produced by the above process sets after mixing with water and preliminary hardening in the air, the powder continues to cure and increase in strength in water. Portland cements are used for binding sand and gravel together to form concrete.

In particular, the following chemical reactions occur in the production of hydraulic lime cements. Limestone (lime) $CaCO_3$ is roasted to produce quicklime CaCO. Quicklime, CaCO, is then slaked (water added) to produce slaked lime $Ca(OH)_2$. Slaked lime, $Ca(OH)_2$ is then converted, by way of the action of atmospheric carbon dioxide, $CO_2$, back into lime $CaCO_3$, which hardens cement as a result of crystallization of the $CaCO_3$ (the formation of elongated crystalline needles). It is this crystallization, which gives lime cement its strength.

Portland cement concrete is the most popular and widely used building materials today as a result of the global availability of raw materials for its production, its ease for preparing with water and its ease of fabrication into a plurality of different shapes. Further, to the above, so far as strength of materials is concerned, it was the discovery in 1757 by Smeaton, using scientific methods, of the lost art of cement making (lost in the Middle Ages), that it was the presence of clay 'impurities' in limestone, $CaCO_3$, that gave Portland cement (so named because of the similarity of clay impurities used to those found in the Portland area of England) its great strength.

The production of Portland cement is an extremely resource and energy intensive process. There are major drawbacks with respect to sustainability of Portland cement production including:

About 1.5 tons of raw materials are needed to produce every ton of Portland cement.

Cement and lime manufacture is reported to produce from 8% to 10% of global carbon dioxide emissions annually. In particular, about one ton of carbon dioxide ($CO_2$) is released into the atmosphere for every ton of Portland cement produced.

Co-grinding of cement clinker and limestone, with $CO_2$ capture in the cement powder, can be used to make Portland cement. However, this process has an adverse effect on the concrete's workability.

Concrete made of Portland cement deteriorates when exposed to severe environments, and is eroded by weak acids. Portland cement has limited autogenous healing behavior. Cracking and corrosion have significant influence on Portland cement's service behavior, design life and safety.

Further to the above, Portland cement repels cellulose and cannot incorporate organic silicate fibers such as bamboo, hemp or rice husks into the cement matrix. When organic silicate fibers are use as reinforcing natural fibers, notably lignin and hemicellulose, then the cement produced is typically susceptible to degradation.

An alternative to hydraulic cements like Portland cement, are the alkali-activated cements. Alkali activated cement can be made from ground granulated blast furnace slag (metallurgical slag and fly ash) and is not hydraulic (not solidifying without alkali activation and in particular under water) but rather must be "activated" by addition of caustic alkalis such as caustic soda, NaOH, or lime (an economical choice) so that the cement will set. These alkali-activated cements use common industrial by-products and cure at room temperature into compact well-cemented composites, with similar workability to Portland cement. Alkali activated cements have the advantages of low energy costs, high strength and good durability compared to Portland cement.

Geopolymer cement, being alkali-activated aluminum silicate cement, can include aluminosilicate minerals from thermally activated clays and ground granulated blast-furnace slag or fly ash. The mortar formed from geopolymer cement sets hard with the addition of a highly alkaline silicate solution. Geopolymers have favorable properties such as being made from abundant raw resource, little $CO_2$ emission, less energy consumption, low production cost, high early strength and fast setting.

However, disadvantages of geopolymers and other alkali-activated cements include:
 water being released rather than being consumed in their setting, with the result that making these cements fluid enough for easy placement is difficult;
 the presence of poorly crystalline aluminosilicate gels containing alkalis, have an open micro sieve molecular structure and accordingly suffer from nano-porosity durability flaws;
 the cements also exhibit larger drying shrinkage than Portland cement, which can lead to cracking;
 further alkali-activated cements exhibit efflorescence problems due the formation of alkali carbonates.

Magnesium Phosphate Cements are chemical cements that rely on the precipitation of insoluble magnesium phosphate from a mix of magnesium oxide and a soluble phosphate. The oxides such as magnesium, aluminum or zirconium, will react with phosphoric acid at room temperature forming a coherent mass, setting quickly and giving high early strength. Magnesium oxide cement has much lower associated energy consumption and $CO_2$ emissions compared to Portland cement. These cements develop considerably greater compressive and tensile strengths. Magnesium-based cements also have a natural affinity for cellulose materials, such as vegetable fiber reinforcement. Further, magnesium phosphate cements can incorporate a higher proportion of non-toxic industrial waste.

Magnesium phosphate cements have the following disadvantages:

cost is up to three times that of the same weight of Portland cement;
very rapid and highly exothermic setting reactions can produce expansion and cracking;
composed predominantly of nanometric pores which result from the hydration process;
a large proportion of course pores due to the release of water during condensation of the gel.

SUMMARY OF THE INVENTION

Problems with background art including (as recited above and as identified by the inventor):
a) high volume of $CO_2$ emissions;
b) poor workability;
c) atmospheric deterioration;
d) poor autogenic healing capacity;
e) high cost;
f) exothermic reactions leading to expansion and cracking;
g) incompatibility with natural material fibers including bamboo, cellulose and rice husks;
h) porosity including nanometric porosity;
i) efflorescence;
j) inability to incorporate non-toxic industrial wastes.

Technical Problem

To ameliorate some of the effects of the general problems and the specific problems as recited above and in particular to provide, at least in part, a cement having improved physical properties that can include: reduced porosity, improved strength and improved durability.

Technical Solution

Technical Solution: dissolving organic binders that bind silicates in organic matter, including cellulose, so as to free up the silicates for reaction with other cement constituents including metal oxides and in particular calcium derived from lime. The process can be undertaken using a vast array of disparate organic chemicals in the form of solutions, colloids, suspensions and mixtures, the chemicals including: acids, chelates, alkali solutions and in some cases chemicals that are arguably amphoteric in nature. Central to the inventor's discovery is the realization that a "physical process", be it chemical, electrical or mechanical in nature that is sufficient to remove synthetic silicates (silicates in natural organic material as opposed to those found in natural rock formations) bound in organic matter from their binders so as to enable the silicates to react with other cement components can improve the properties of cements. Preferably also the process of removing the silicate will damage the silicate by a plurality of processes, some including silicate etching, so as to serve as centers for crystal growth. Preferably also the "physical" processes involved in the removal, or at the least exposure of the silicates to other cement reactants, will reduce particle size of reactants so as to improve the effectiveness of reactions taking place during cement production. The above processes can also be applied to natural silicates (rocks, sea shells, chalks and Pozzolanic compounds) where the silicate is otherwise bound and its reactions with other cement constituents impeded without attempts being made to further expose the silicates to other cement reactants by means including at least one of chemical, mechanical, thermal or electrical.

Increasing the concentration of nucleation sites for metal silicate crystals by using a plurality of organic additives solves the problem of porosity.

Accordingly, a class of hydraulic, organic chemical, activated cements are formed by reacting powdered metal oxides, alkali silicates and silica bearing minerals which set at near neutral pH and ambient conditions under the influence of an organic chemical activating agent when mixed with water to form a monolithic cement (the cement can contain fillers, aggregates or natural organic silica fibers).

In one aspect of invention a cement is recited including:
an alkali silicate;
an organic silicate;
a compound selected from a group consisting of Pozzolanic compounds and synthetic Pozzolanic substitutes;
a metal oxide;
an organic activator.

DETAILED DESCRIPTION OF THE PREFERRED EMBODIMENT

Best Mode

Definitions and Terms

The description in the body of the specification pertains to 'preferred' modes of invention. Accordingly, features recited in the body should not be construed to be essential features of the invention unless explicitly indicated. Further, any reference in the body to the expression 'invention' should be construed to imply a reference to preferred embodiments only.

The recitation of problems recited in the Background Art section above, does not constitute an admission against interest that persons, other than the present inventor, identified the problems in the prior art.

Gesser H D, "Applied Chemistry", Springer, 2002, provides a reference source for basic technical terminology used in relation to cements.

Reactants according to one mode of the present invention include:

Primary metal oxides are most preferably Aluminum oxide $Al_2O_3$ and preferably:
Calcium oxide CaO;
Magnesium oxide MgO
Iron oxide $Fe_2O_3$ Secondary metal oxides are preferably Titanium dioxide $TiO_2$ (Titanium White) due to its self-cleaning effect and due to its role in the creation of crystal nucleation sites.

Transition metal oxides that form colored pigmentation are preferable, most notably:
Zinc oxide ZnO (neutral white)
Iron oxide $Fe_3O_4$ (Mars Black);
Hydrated iron oxide $Fe_2O_3.H_2O$ (Yellow Ochre);
Anhydrous iron oxide $Fe_2O_3$ (Red Ochre).

Pozzolanic compounds that are a source of silica bearing minerals or metal silicates (containing $SiO_2$, $Al_2O_3$, $Fe_2O_3$ and CaO). Synthetic compounds having properties similar to Pozzolanic silicates include (hereinafter referred to as synthetic Pozzolanic substitutes):
Class F fly ash:
Class C fly ash
metakaolin kaolin clay
zeolite
Blast-furnace slag
Silica fume;
Rice hull ash;
Alkaline silicates are preferably Potassium silicate $K_2SiO_3$ and preferably:
Lithium silicate $Li_2SiO_3$
Sodium silicate $Na_2SiO_3$
Preferred organic silica include:
vegetable fiber reinforcement including untreated rice hulls;
Hemp;
Sisal;
Bamboo fibers;
Caesar-weed;
Banana stems;
Sugarcane;
Date palm;
Straw;
Coir fibers from coconut husks
Natural sponge fibers
Wood waste
Water-soluble activators, including in some cases chelates, include:
Edetic Acid (EDTA) $C_{10}H_{16}N_2O_8$. (a strong colloidal silica dissolver and a chelate
Ammonium Difluoride $F_2H_5N$
Ammonium Fluoride $FH_4N$
Potassium Bifluoride $F_2HK$
Phosphoric Acid $H_3O_4P$
Phosphorous Acid $H_3O_3P$
PBTC Phosphonobutane-tricarboxylic acid $C_7H_{11}O_9P$
Sodium Glucoheptonate Dihydrate $C_7H_{13}NaO_8.2H_2O$
HEDTA ethylenediamine-triacetic acid $C_{10}H_{18}N_2O_7$
DTPA Diethylene Triamine Penta Acetic acid $C_{14}H_{23}N_3O_{10}$
DTPA Pentetric Acid $C_{14}H_{23}N_3O_{10}$
DL-Malic Acid $C_4H_6O_5$
Pyridine-N-Oxide $C_5H_5NO$
L-Histidine $C_6H_9N_3O_2$
L-Phenylalanine $C_9H_{11}NO_2$
Oxyquinoline $C_9H_7NO$
Dopamine $C_8H_{11}NO_2$
Carboxlic Acids
Citric Acid $C_6H_8O_7$
Acetic Acid $C_2H_4O_2$
Oxalic Acid $C_2H_2O_4$
Formic Acid, HCOOH
EDTA Edetic Acid $C_{10}H_{16}N_2O_8$
Boric Acid $BH_3O_3$
Lactic Acid $C_3H_6O_3$
Acetylacetone $C_5H_8O_2$
DHBA Catechol $C_6H_6O_2$
Gallic Acid $C_7H_6O_5$
DHBA Pyrocatechuic Acid $C_7H_6O_4$
DOPAC $C_8H_8O_4$
Fluorone Black $C_{19}H_{12}O_5$
Monosodium Glutamate $C_5H_8NNaO_4$ Mode for Invention Industrial Applicability One embodiment of the present invention uses an alternative aqueous-based solution-colloid processes for manufacturing of modern functional inorganic materials such as concrete, cements, mortars, concrete bricks, stoneware and trowel-able plasters, water-resistant plasterboards, silicate paints.

In one embodiment, according to a hydraulic chelate-activated cement the following properties include (approximately in order of importance):
Concrete production, as a substitute cementing material for Portland cement;
Embankments and other structural fills (usually for road construction)
Waste stabilization and solidification
Mineral filler in asphaltic concrete
Mine drilling fluid and bore cement
Stabilization of soft soils and water harvesting
Road sub-base construction
As an aggregate substitute material (e.g. for brick production)
Waterproof hard wall plasterboard, plaster setting compounds and stucco
As a substitute for ceramic floor, wall and paving tiles;
As a substitute for concrete and ceramic roofing tiles;
Composite insulated panels for house siding and trim,
As a binding agent in mineral silicate paints and undercoats;
Grout and flow-able fill production
Patching mortar for masonry repairs
Carbon fiber reinforced auto bodies and boat hulls
Other applications include kitchen counter tops, flotation devices, stucco, decking, fireplace mantles, cinder block, structural insulated panels, blasting grit, recycled plastic lumber, utility poles, railway sleepers, highway sound barriers, marine pilings, door and window frames, sign posts, paving stones, park benches, landscape timbers, planters, pallet blocks, bowling balls and artificial reefs.

Tentative qualitative explanations of some of the processes in preferred embodiments, in use, follow. In the following embodiments, some activators can include chelates, some reactions can by catalytic in nature and some products of reactions can take on the appearance of a mineral polymer.

Alternative aqueous-based solution processes for manufacturing of hard setting functional inorganic silica based materials can be formed from metal alkoxide solutions using embodiments of the present invention. The precursor used in a sol-gel process according to one embodiment of the present invention consists of a metaloid element, colloidal/amorphous silicate and any of a number of organic activators. Metal oxides, such as aluminates, calcium based reactants and titanates are preferred precursors because of their high reactivity towards water. The sol-gel process according to one embodiment of the present invention consists of a series of hydrolysis and condensation reactions of dissolved colloidal silicates.

According to one embodiment, the process consist of:
a) dissolution of metal oxide, silicate and metal-silicate precursors by an organic activator to provide the metal ion and all or part of the Si constituents needed, followed by;
b) an hydrolysis reaction to generate metal and silicate species and finally;
c) condensation of these species and or silicates from the activator to build up a structure having the appearance, under SEM (scanning electron microscopy) of a mineral polymer network structure.

Enhanced Durability

Through the sol-gel process, homogenous, high durability inorganic metal silicates can be made at ambient temperature and at neutral or weakly alkaline PH rather than the high temperature and alkalinity required in conventional approaches for hydraulic cement materials. It is observed from SEM test results that a 3-dimensional gel is formed throughout the sample on curing that has the appearance of a mineral polymer. This pore filling process that incorporates metal silicate crystals provides additional beneficial effects such as higher strength; better wear resistance, greater durability, lower porosity and chemical stability.

Autogenous Heating

Arguably, calcium complexes are not spent as they form cement crystals, but rather continue to work on their substrate. Complex molecules can be argued to diffuse naturally in solution through pores and voids of cement, masonry and plaster materials. Both water and space must be present for the crystals to form. The space is often provided by cracks that form due to damage to the substrate caused by weathering, drying shrinkage, or other mechanisms such as chloride or acid attack.

Pigment Binder

Metal oxides in the form of mineral pigments are incorporated into the silica matrix rather than being present as an inert filler. Activators are also shown to form silica compounds with the most common pigments that are used as coloring oxides in cement. These pigment crystals are integral with the coating and less maintenance is required at the surface if there is chipping or cracking thus exposing the interior concrete. The pigments have been examined by SEM and reacted chemically to some extent in the cement crystal increasing process.

Self-Cleaning Capabilities

When titanium dioxide ($TiO_2$) absorbs ultraviolet light, it becomes and breaks down pollutants that come into contact with the concrete's surface. Several recent investigations have reported the ability of titanium dioxide and silica complexes (TiO2.SiO2), in combination with UV light, to kill various microbial and removed air pollution [J. S. Dalton, P. A. Janes, N. G. Jones, J. A. Nicholson, Hallam, G. C. Allen, "Photocatalytic oxidation of $NO_x$ gases using $TiO_2$: a surface spectroscopic approach", Environmental Pollution 120 (2002) pp. 415-422.]. Moreover, it was previously claimed by thermal analysis and SEM, that $TiO_2$ cannot be reacted with Portland cement and water, instead forming a fine non-reactive filler to cement that modifies the hydration reaction primarily due to dilution [Thanongsak Nochaiya and Arnon Chaipanich, "The effect of nano-$TiO_2$ addition on Portland cement properties", Cement and Concrete Research Laboratory, Department of Physics and Materials Science, Faculty of Science, Chiang Mai University, Chiang Mai, Thailand, 50200]. The addition of an activator, which can include a chelate according to one embodiment of the present invention, has shown that titanium dioxide and silica complexes have been formed under the influence of the activator (which can have a catalytic effect in one embodiment).

Scanning electron microscope (SEM) analysis of the coating confirms that in the case of a catalyst activator according to one embodiment, that a ligand, forms chelate complexes within the coating. Metal ions have formed insoluble precipitates with silica, a prominent example being calcium silicate hydrate, the primary product of the hydration of Portland cement that is primarily responsible for the strength in cement based materials. SEM images show that the secondary hydration products grow in the form of fibers on both $C_3S$ scaffold, $Ca(OH)_2$ and $CaCO_3$ crystals. SEMQuant microanalysis of the fibrous particles indicates calcium metasilicate $CaOSiO_2$ as wollastonite.

In the influence of a Oxalic Acid $C_3H_2O_4$ chelate the element spectra graph shows the presence of other metal silicates including: sodium metasilicate $Na_2SiO_3.nH_2O$; Aluminium silicate $Al_2SiO_3$; Potassium Silicate $K_2SiO_3$; Titanium Silicate $TiO_2SiO_2$; and iron Silicate $Fe_2SiO_4$.

The invention claimed is:

1. A process for making a cement, the cement containing a naturally occurring silicate bound in an organic binder, and a metal oxide, the process comprising:
dissolving the organic binder at least in part using an effective amount of a chemical activator in order to provide
the silicate to react with other components of the cement;
providing the silicate to participate in crystal growth; and
providing the silicate so that the cement is a structural load bearing cement.

2. The process recited in claim 1, wherein the chemical activator is selected from a group comprising at least one of: a ligand, a chelate, a mineral acid, an organic acid, an amino acid derivative, an alkali, an amphoteric compound, a biochemical, a salt, and an etching agent.

3. The process recited in claim 1, wherein the chemical activator is pyridine N oxide.

4. The process recited in claim 1, wherein the chemical activator is a chelate selected from a group comprising at least one of: EDTA, PBTC, HEDTA, DTPA, oxyquinoline, and oxalic acid.

5. The process recited in claim 1, wherein the chemical activator is boric acid.

6. The process recited in claim 1, wherein the chemical activator is an organic acid selected from a group comprising at least one of: DL-malic acid, a carboxylic acid, citric acid, acetic acid, formic acid, lactic acid, DHBA, gallic acid, and acetylacetone.

7. The process recited in claim 1, wherein the chemical activator is an amino acid selected from a group comprising at least one of: L-histidine, and L-phenylalanine.

8. The process recited in claim 1, wherein the chemical activator is a biochemical selected from a group comprising at least one of: dopamine, and DOPAC.

9. The process recited in claim 1, wherein the chemical activator is monosodium glutamate.

10. The process recited in claim 1, wherein the chemical activator is an etching agent selected from a group comprising at least one of: ammonium difluoride, ammonium fluoride, potassium bifluoride, phosphoric acid, and phosphorous acid.

11. The process recited in claim 1, wherein the metal oxide is a primary metal oxide selected from a group comprising at least one of aluminum oxide, calcium oxide, magnesium oxide, and iron oxide.

12. The process recited in claim 1, wherein the metal oxide is a secondary metal oxide selected from a group comprising at least one of: titanium dioxide (titanium white), zinc oxide (neutral white), iron oxide (mars black), hydrated iron oxide (yellow ochre), and anhydrous iron oxide (red ochre).

13. A process for making a cement, containing a naturally occurring silicate bound in an organic binder, and a metal oxide, comprising:

dissolving the binder, at least in part, using an effective amount of a chemical activator so that;
dissolution of the binder enables the silicate to react with other components of the cement;
dissolution of the binder enables the silicate to participate in crystal growth;
dissolution of the binder configures the cement as a structural load bearing cement.

14. A process for making a cement, the cement containing a naturally occurring silicate bound in an organic binder, and a metal oxide, the process comprising:
dissolving the organic binder at least in part using an effective amount of a chemical activator in order to provide the silicate to react with other components of the cement;
providing the silicate to participate in crystal growth; and
providing the silicate so that the cement is a structural load bearing cement;
wherein the chemical activator is a chelate selected from a group comprising at least one of: EDTA, PBTC, HEDTA, DTPA, oxyquinoline, and oxalic acid.

* * * * *